Oct. 21, 1941.    B. MAYER    2,260,120
CAMERA SHUTTER MECHANISM
Filed April 3, 1939    4 Sheets-Sheet 2
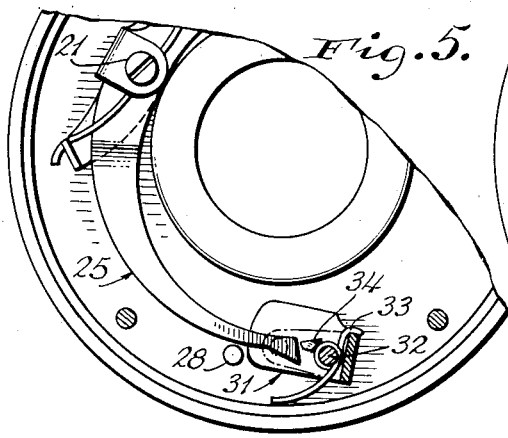
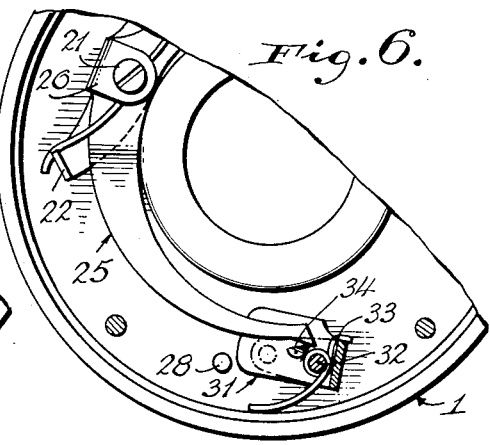
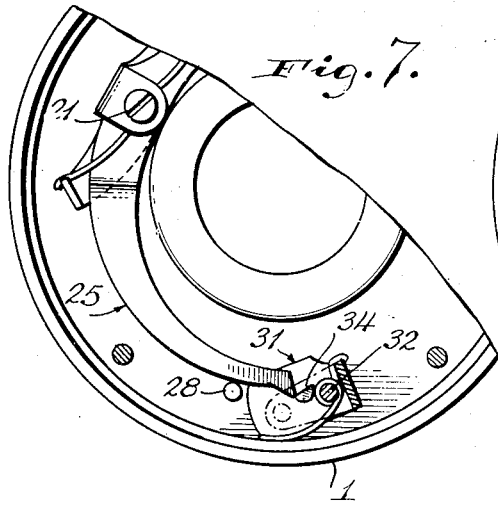
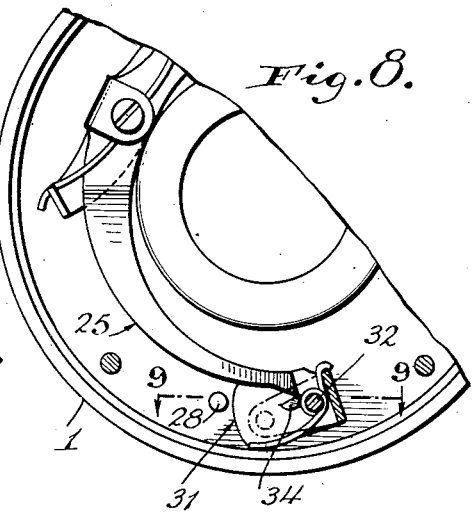
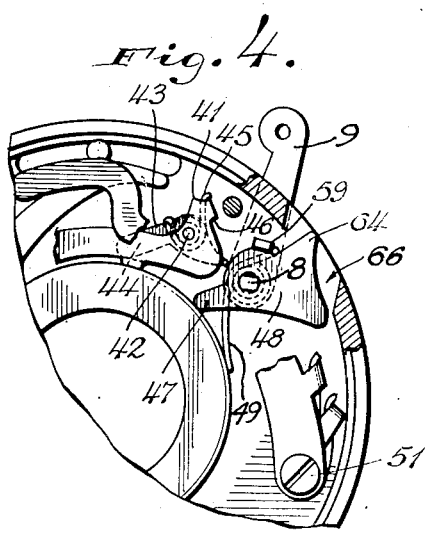
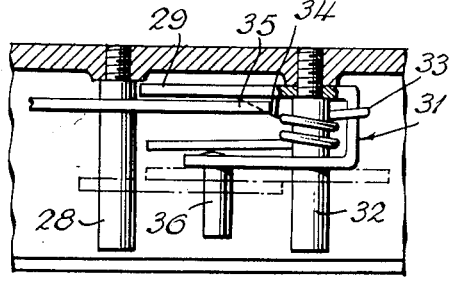
INVENTOR
BRUNO MAYER
BY
ATTORNEYS Oct. 21, 1941.   B. MAYER   2,260,120
CAMERA SHUTTER MECHANISM
Filed April 3, 1939   4 Sheets-Sheet 3

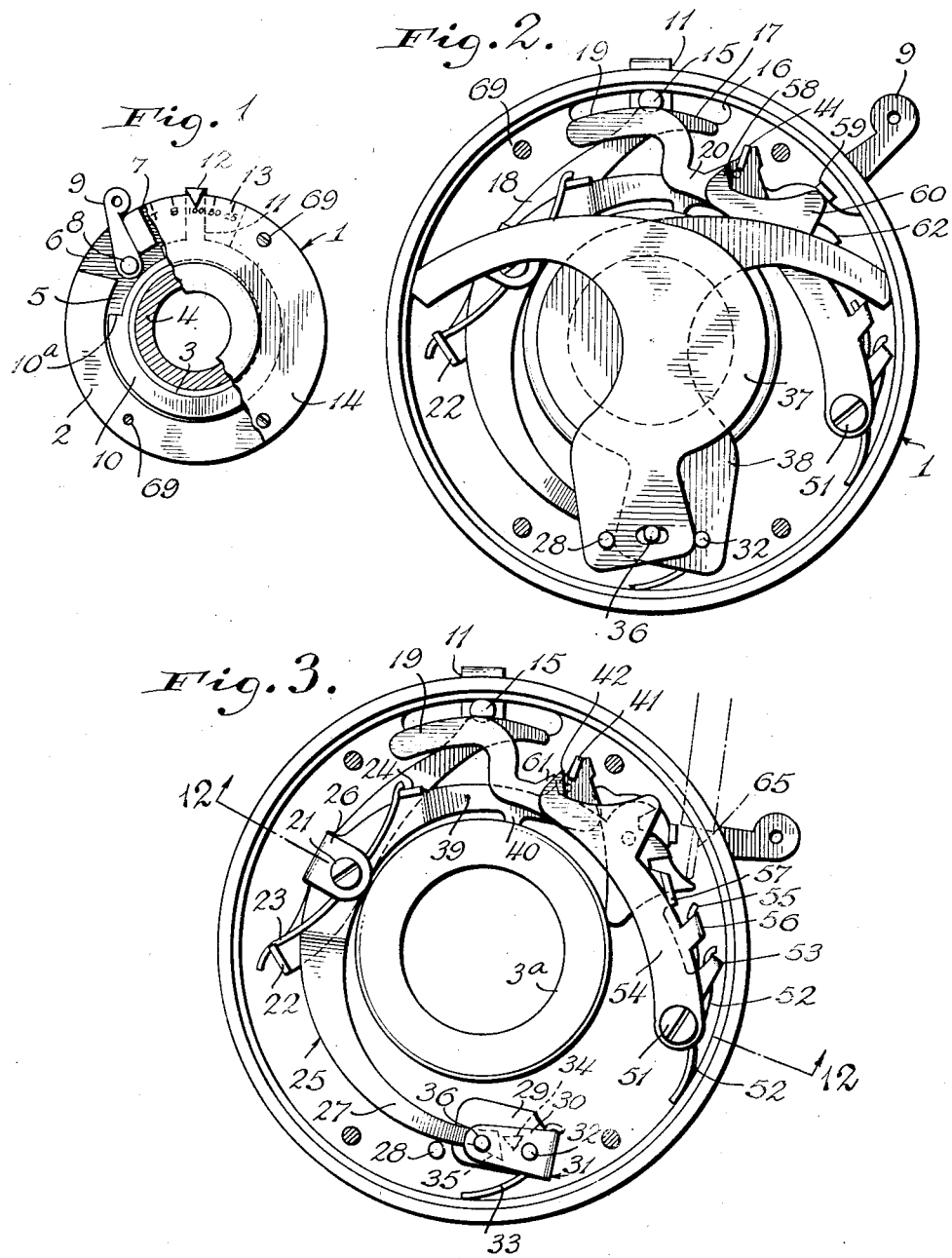

INVENTOR
BRUNO MAYER
BY
ATTORNEYS

Oct. 21, 1941.   B. MAYER   2,260,120
CAMERA SHUTTER MECHANISM
Filed April 3, 1939   4 Sheets-Sheet 4

INVENTOR.
BRUNO MAYER
BY
ATTORNEYS.

Patented Oct. 21, 1941

2,260,120

UNITED STATES PATENT OFFICE 2,260,120

CAMERA SHUTTER MECHANISM

Bruno Mayer, New York, N. Y.

Application April 3, 1939, Serial No. 265,674

8 Claims. (Cl. 95—62)

This invention relates to cameras and more particularly to the mechanism for operating the shutter of a camera.

The principal object of the invention is to provide an improved shutter operating mechanism for a camera which is simpler in construction and embodies fewer parts than the shutter mechanisms now employed.

Another object of the invention is to provide an improved shutter operating mechanism which will be relatively inexpensive to construct and assemble and at the same time very durable and efficient in operation.

Figure 10:
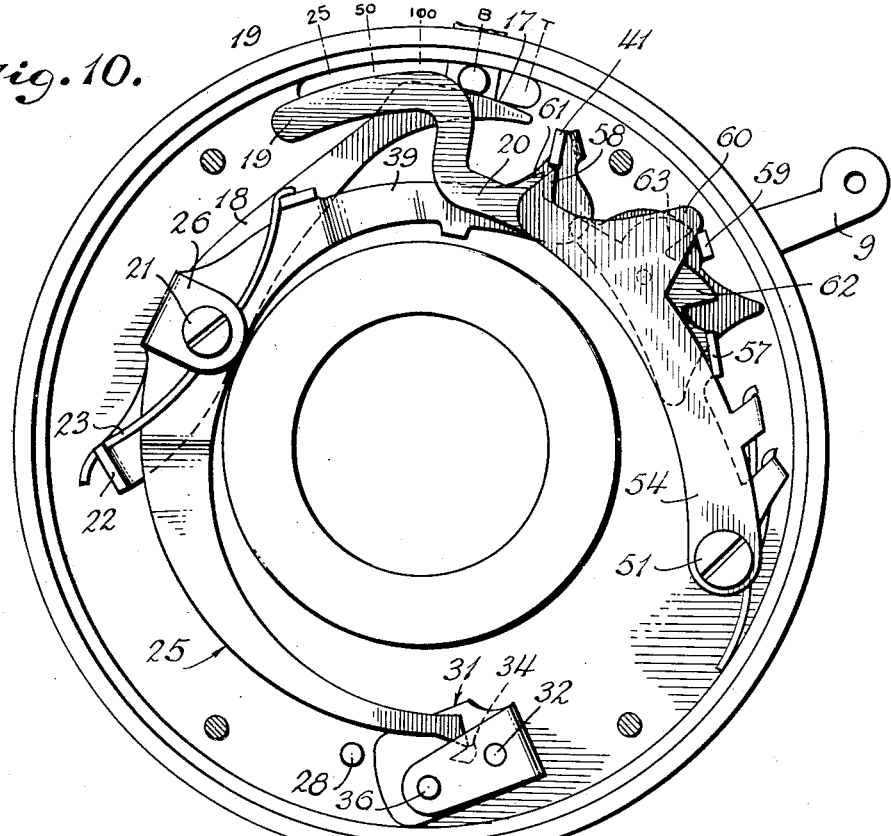
Figure 11:
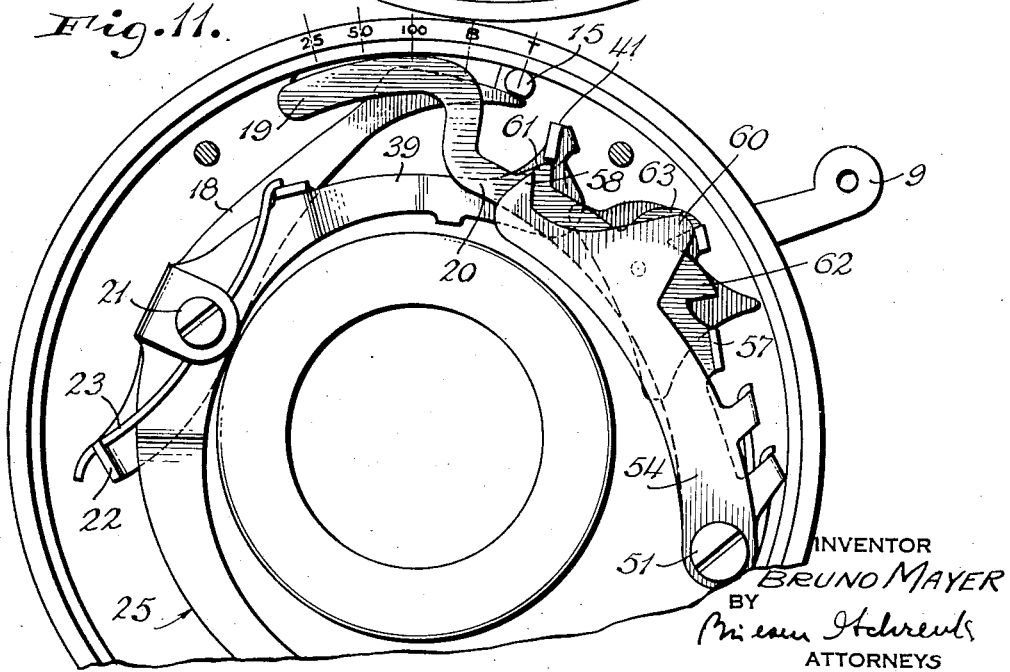
Figure 12:
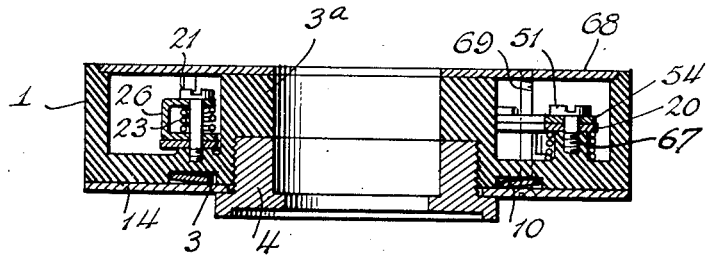
Figure 13:
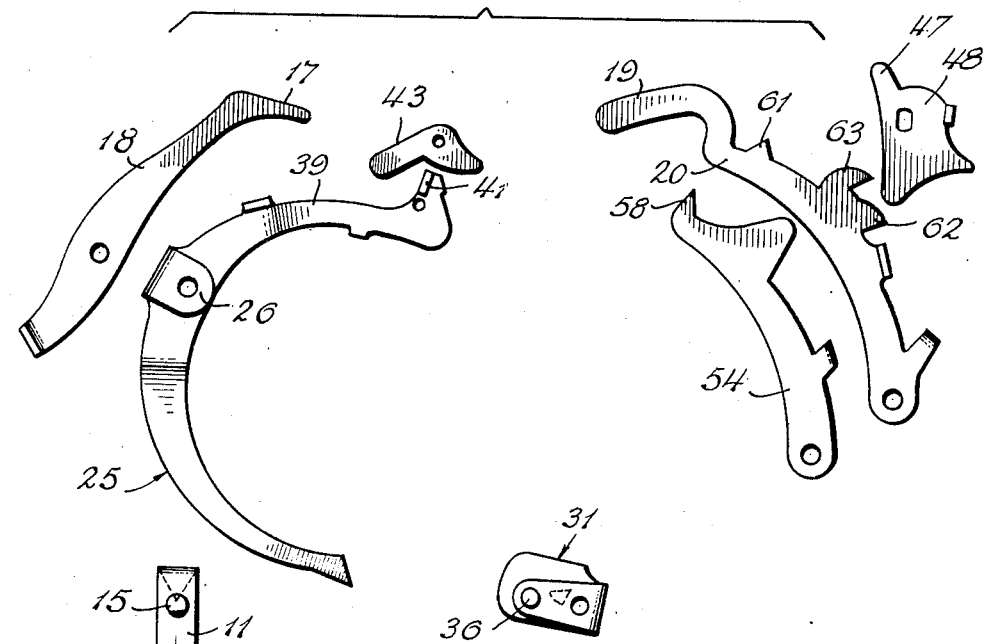
Figure 14:
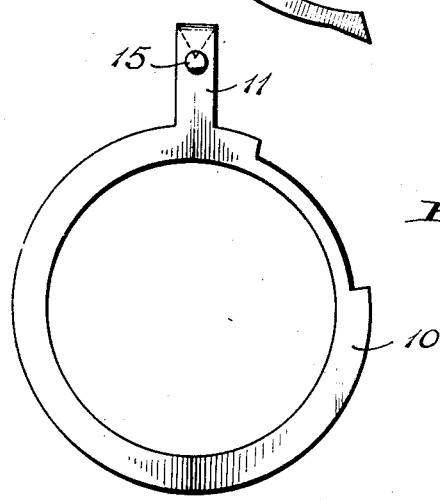

Other objects and advantages of the invention, as well as the novel features thereof, will appear more fully after a perusal of the following specification read in connection with the accompanying drawings in which Fig. 1 is a front view of a camera shutter unit constructed in accordance with the invention, the front plate thereof being broken away to show the construction and arrangement of the front wall of the casing and associated parts; Fig. 2 is an enlarged rear view of the unit with the rear covering plate removed to show the interior shutter operating mechanism, the parts comprising the latter being shown in their normal or at rest positions when the unit is adjusted for an exposure of one-one hundredth of a second; Fig. 3 is a view similar to Fig. 2 showing the relation of the several parts of the mechanism when the release lever has been moved to its lowermost or actuated position, a cable release being shown in dotted outline to illustrate its coaction with the shutter mechanism; Figs. 4 to 8, inclusive, are partial rear views of the unit with the shutters removed to more clearly show the parts illustrated; Fig. 4 illustrating a detail of the tripping lever and controlling mechanism therefor in their normal or at rest positions, the latter mechanism being partially broken away for the sake of clearness; Fig. 5 illustrates the association of the tripping lever with the shutter control mechanism in their normal positions, the latter mechanism being shown in section; Fig. 6 is a similar view showing the tripping lever in position to actuate the tab on the shutter control mechanism to open the shutters; Fig. 7 is a similar view showing the tripping lever at the completion of its return stroke with the shutter control mechanism ready to return the shutters to their normal or closed position and Fig. 8 is a similar view showing the positions of the tripping lever and shutter control mechanism during the taking of bulb or time exposures, the shutters being maintained in open position during the arrangement of the parts; Fig. 9 is a sectional view taken along the line 9—9 of Fig. 8; Fig. 10 is an enlarged detailed rear view of the shutter operating mechanism during the taking of bulb exposures, the release lever having been actuated to its lowermost position and the mechanism positioned to retain the shutters in opened position; Fig. 11 is a similar view showing the arrangement of the parts of the shutter operating mechanism during the taking of time exposures, the release lever having returned after its first downward movement and the shutters being held in opened position; Fig. 12 is a sectional view taken along the line 12—12 of Fig. 3; Fig. 13 is an exploded view of the shutter operating mechanism to show the parts thereof more clearly and Fig. 14 is a rear view of the time setting finger piece.

In the drawings the numeral 1 indicates the annular casing for the lens unit and shutter operating mechanism. The casing 1 is provided with an annularly shaped front wall 2 having integrally formed with its inner periphery, a rearwardly extending annularly shaped portion 3 which is internally threaded to threadedly receive the lens unit 4 and which is provided at its rear end with an inwardly extending annular flange 3a. Encircling the annular portion 3 of the casing and formed in the front face of the front wall is an annular groove 5 which at the upper end of the casing communicates with the spaced recesses 6 and 7 formed in the peripheral edge portion of the front wall 2. Disposed in flat relation in the recess 6 and fixedly attached to a pin 8 which is positioned at the juncture of such recess with the groove 5 and which extends rearwardly through an aperture in the front wall 2 of the casing, is a release lever 9 by which the user controls the operation of the shutter mechanism. Positioned in the annular groove 5 is an annular member 10 made of spring metal and having an outwardly extending finger piece 11 which is disposed in the recess 7 and is adapted to be shifted within the confines of such recess, the annular spring member or body portion 10 thereof being slotted as at 10a to enable rotative movement of such body with respect to the release lever 9 without interfering with the latter. The outer end of the finger piece 11 is bent forwardly around the periphery of a cover plate 14 removably secured to the front wall 2 of the casing 1 and is provided at its outer extremity with a pointer shaped portion or indicator 12 which cooperates with a scale 13 provided on the cover plate 14 to indicate the setting of the shutter operating mechanism. The annular spring member 10 or body portion of the indicator is bent so that such body portion bears with a spring pressure against the inner surface of the groove 5 and the interior surface of the cover plate 14, whereby such body portion and consequently the indicator portion 12 thereof will stay in the position in which it is placed with respect to the scale 13 and looseness or vibration of such member is prevented. The finger piece 11 is provided intermediate its ends with a pin 15 which extends rearwardly through an elongated arcuately-shaped slot 16 provided in the front wall 2 of the casing into engagement with the outer cam surface 17 of a lever 18 and the outer cam surface 19 of a control lever 20, as is shown in Figs. 2 and 3 of the drawings.

The lever 18 is positioned in flat relation adjacent to the inner face of the front wall 2 of the casing and is pivotally mounted intermediate its ends on a pin or screw member 21 which is threadedly attached to the front wall 2 of the casing. The opposite end of the lever 18 is bent upwardly at right angles to provide a rearwardly extending lug or tab 22 to which is secured one end of a spring 23. The spring 23 is coiled around the pin 21 and secured at its other end to a rearwardly extending tab 24 disposed on the other side of the pin 21 and integral with a tripping lever 25 so as to normally bias the lever 18 in a counter-clockwise direction as viewed in Figs. 2 and 3, and thereby maintain the outer cam surface 17 thereof in the path of movement of the pin 15.

The tripping lever 25 is provided intermediate its ends with an aperture through which extends the pin 21 and in the region of such aperture, with a tab portion 26 which extends rearwardly to span the wound portion of the spring 23 on the pin 21 and is bent at its free end into parallelism with the body of the lever 25. The free end of the tab 26 is provided with an aperture through which also extends the pin 21, the head of the latter bearing against the rear face of such portion of the tab 26. The tripping lever 25 has a lower arcuately shaped arm portion 27 which extends in the space between the outer or side wall of the casing and the rearwardly extending annular portion 3 thereof to the lower portion of such casing and is normally maintained adjacent to a stop pin 28 under the influence of the spring 23. The outer extremity of the arm 27 is positioned between the legs 29 and 30 of a U-shaped member 31 which is pivotally mounted on a pin 32 secured to the front wall 2 of the casing and extending rearwardly through aligned apertures provided in the legs 29 and 30 of such member adjacent to their connected ends. The legs 29 and 30 are normally biased away from the outer wall of the casing by means of a spring 33 which is coiled around the pin 32 and has one end bearing against the interior surface of the side wall of the casing and its other end secured to the central connecting portion of the U-shaped member 31. Punched out of the front leg 29 is a substantially triangularly shaped tab member 34 which extends rearwardly into the path of movement of the extremity of the arm 27 of the tripping lever. The tab member 34 is shaped so that it offers little resistance to the lever arm 27 as it moves toward the annular portion 3 of the casing but blocks the return movement of such arm, as will be hereinafter more fully explained, the toe or angularly disposed edge portion 35 of the arm 27 engaging with the tab 34 during its return movement, as is shown in Fig. 6. Mounted on the free end portion of the leg 30 is a pin 36 which extends rearwardly through aligned elongated apertures provided in the base or root portions of the shutters 37 and 38 which are pivotally mounted on the pin posts 28 and 32, respectively, such pin 36 controlling the opening and closing of the shutters 37 and 38 when the U-shaped member 31 is actuated by the tripping lever 25.

The other arm 39 of the tripping lever 25 is provided with a stop tab 40 which bears against the outer surface of the annular portion 3 of the casing in the normal position of the lever 25 and limits the movement of the arm 39 towards such portion 3. Secured to the outer extremity of the arm 39 of the lever 25 is a rearwardly extending member 41 formed from the material of which such lever arm is constituted and a forwardly extending pin 42 upon which is pivotally mounted a pawl member 43. The pawl member 43 is normally biased in a counter-clockwise direction so that the leg 44 thereof engages the tab 40 of the lever 25 by means of a spring 45 which is coiled around the pin 42 and is secured at one end to the leg 44 of the pawl and at its other end to a forwardly extending tab 46 formed on the tripping lever 25 (see Fig. 4). The pawl 43 is associated with a tooth 47 formed on a plate member 48 secured to the inner end of the pin 8, such plate 48 and consequently the release lever 9 being normally biased in a counter-clockwise direction, as viewed in Fig. 4 of the drawings, by a spring 49 which is coiled around the pin 8 and has one end secured to the projection 50 and its other abutting against the annular portion 3 of the casing, such spring being strong enough to automatically return the release lever 9 to its normal or at rest position against the tension of the spring 45 of the pawl member 43.

It will be evident from the foregoing description that by varying the position of the indicator 12 with respect to the scale 13 the position of the outer cam surface 17 of the lever 18 will be varied with respect to the axial center of the device whereby the rearwardly extending tab 22 thereof will be shifted about the pin 21 as a center to vary the tension of the spring 23. The outer cam surface 17 of the lever 18 is so formed that the tension on the spring 23 is not increased when the indicator 12 is set for one twenty-fifth of a second but is placed under increasing tension as the indicator 12 is moved to a setting of one one-hundredth of a second, the tension on the spring being decreased as the finger piece is moved over to the marking "T" designating "time" on the scale 13. When the release lever 9 is pivoted downwardly from the position shown in Fig. 2 of the drawings to the position shown in Fig. 3, the tooth 47 on the plate member 48 engages with the pawl 43 to lift the latter and thereby the arm 39 of the tripping lever 25, in a counter-clockwise direction, the leg 44 of the pawl through its engagement with the lug or tab 40 of the lever 25 preventing rotative movement of the pawl 43 during this action. As the lever 25 is then rotating in a counter-clockwise direction, the outer extremity of the arm 27 of such lever moves toward the axial center of the device and during such movement rides over the tooth 34 provided on the leg 29 of the U-shaped member 31 to a point inwardly of such tooth. As the release lever 9 reaches the end of its downward movement, the tooth 47 slips out of engagement with the pawl 43 thereby enabling the tripping arm 25 to snap back to its normal position under the tension of the spring 23, the toe or inclined edge 35 of the arm 27 of the tripping lever 25 during such return movement striking the projection 34 out of its path and causing a momentary rotation of the legs 29 and 30 of the U-shaped member 31 outwardly or in a counter-clockwise direction. The outward movement of the U-shaped member 31 moves the pin 36 outwardly to cause the shutters 37 and 38 to rotate to open position about their respective pivots 28 and 32. As soon as the toe 35 of the arm 27 moves past the projection 34 under the influence of the spring 23, the spring 33 comes into operation to return the legs 29 and 30 of the U-shaped member 31 back to their normal position to close the shutters 37 and 38. As has been previously mentioned the time in which this operation takes place is dependent upon the tension which has been placed on the spring 23, the greater the tension under which the spring is placed, the quicker is the action of the tripping lever 25 and consequently the shorter will be the period of opening of the shutters 37 and 38. Upon release of the release lever 9 at its lowermost position the spring 49 associated with the plate 48 will rotate the latter and consequently the release lever 9 back to their normal positions against the tension of the spring 45 associated with the pawl 43, the pawl 43 during this return operation being pivoted out of the way by the tooth 47 of the plate 48 and then returning to its normal position above such tooth under the tension of its associated spring 45 when the tooth 47 has moved past such pawl in its return to its normal or at rest position. A tooth or projection 64 is provided on the plate 48 so that it may be engaged by a cable release 65 controlled by a bulb to actuate the shutter mechanism as above described, instead of using the release lever 9, such cable release 65 extending through an aperture 66 provided in the side wall of the casing as is shown more clearly in Fig. 4 of the drawings.

When the indicator 12 is positioned for a short exposure, the pin 15 thereof also engages the outer cam surface 19 of the control lever 20, such cam surface being so designed that when engaged by the pin 15 in the range between one twenty-fifth of a second and one one-hundredth of a second, the control lever 20 is held at its innermost position to render the bulb and timing mechanism ineffective (see Figs. 2 and 3). The lever 20 is disposed in opposed relation to the levers 18 and 25 and is pivoted on a pin 51 positioned diametrically opposite the pin 21 and threadedly secured to the front wall 2 of the casing. A spring 52 normally biases the lever 20 outwardly from the axial center of the casing, such spring 52 being coiled about the pin 51 and having one end engaging with the interior surface of the side wall of the casing and its other end attached to a tab 53 integral with and projecting forwardly from the body of the lever 20. Also pivotally mounted on the pin 51 to the rear of the lever 20 is a lever 54 which is also normally biased away from the axial center of the device by means of a spring 55 which is coiled about the pin 51 and has one end bearing against the interior surface of the side wall of the casing and its other end secured to a tab 56 integral with and projecting forwardly from the body of such lever. The levers 20 and 54 are disposed in parallel relation adjacent to each other and the lever 20 is provided with a tab 57 which extends rearwardly from its outer edge and engages the outer edge of the lever 54 to force the latter towards the axial center of the device against the tension of its associated spring 55 when the pin 15 attached to the finger piece 11 engages the cam surface 19 of the lever 20 in the range between one twenty-fifth and one one-hundredth of the scale 13, thereby rendering the lever 54 ineffective to perform any effective operations.

When the indicator 12 is positioned at the portion of the scale marked "B" which designates "bulb," the outer cam surface 19 of the time control lever 20 is formed so that the lever 20 and consequently the bulb control lever 54 are enabled under the tension of their associated springs to move outwardly away from the central axis of the casing sufficiently to enable a tooth 58 formed on the extremity of the bulb control lever 54 to come into engagement with the undersurface of the rearwardly extending projection or tab 41 of the tripping lever 25 after the release lever 9 has been moved to its lowermost position, as is shown in Fig. 10, the position of the tooth 58 being determined by the tab 57 on the time control lever 20. In this position of the parts, the extremity or toe of the arm 27 of the tripping lever 25 is in engagement with the projection 34 of the U-shaped member and is holding such member in its outermost position to retain the shutters in open position, the lever 25 being retained in such position and being prevented from completing its return movement by the engagement of the tooth 58 with the projection 41. Upon release of the release lever 9, a tab 59 (see Fig. 10) integrally formed with the plate 48 and projecting inwardly therefrom comes into engagement with a cam 60 provided on the bulb control lever 54 and through such cam moves the tooth 58 of such lever out of engagement with the abutment or projection 41, thereby enabling the tripping lever 25 to complete its return movement to its normal position. As the tripping lever returns to normal position the outer extremity of the arm 27 thereof is moved under the tension of spring 23, past the projection 34 which on being released enables the U-shaped member 31 to return to its normal position under the influence of the spring 33 to close the shutters 37 and 38.

When the indicator 12 is moved to the portion designated "T" on the scale 13, the cam surface 19 of the control lever 20 is entirely free of engagement with the pin 15 associated with such indicator, thereby enabling the lever 20 and the lever 54 to move to their outermost positions under the influence of their springs 52 and 55. In this position of the levers, the tab 57 on the lever 20 has been moved outwardly sufficiently to enable the tooth 58 on the lever 54 to move past the abutment or projection 41 on the tripping lever 25 when the release lever 9 is moved to its lowermost position so that such tooth will not engage with the undersurface of such abutment in this position of the parts and consequently the lever 54 will not affect the operation of the lever 25. The lever 20, however, is provided with a tooth 61 (see Fig. 11) which is positioned on such lever so that when the device is set for time and the release lever 9 has been actuated to its lowermost position, such tooth 61 will come into engagement with the undersurface of the abutment 41. As was the case with the bulb set above described, when the lever 25 is retained in such position by the tooth 61 and abutment 41, the end of arm 27 of such lever will be in engagement with the projection 34 to hold the U-shaped member in outermost position with the shutters 37 and 38 in open position. Upon release of the release lever 9 after this first downward movement, the spring 49 associated therewith moves such lever towards its normal or at rest position, the full return of such lever being blocked by a stop 63 formed on the lever 20 (see Figs. 11 and 13). The return movement of the lever 9, however, is sufficient to enable the abutment 59 on the plate 48 to engage the cam 60 on the lever 54 and through such cam move the lever 54 inwardly about its pivot 51 so that the tooth 58 thereof is moved past the projection 41 of the tripping lever 25, whereby such tooth 58 is rendered ineffective to exert any restraining influence on the tripping lever 25. The release lever 9, however, by reason of its interception by the stop 63 during this return movement, does not affect the position of the control lever 20 so that the tooth 61 thereof remains in engagement with the projection 41 to retain the tripping lever 25 in the position illustrated in Fig. 10 with respect to the U-shaped member 31. When the release lever 9 is next actuated to its lowermost position, the projection 59 of the plate 48 engages with a cam surface 62 on the control lever 20 and through such cam surface moves the control lever 20 inwardly towards the axial center of the casing to disengage the tooth 61 thereof from the projection 41 thereby releasing the tripping lever 25 and enabling the extremity of the arm 27 thereof to move past the projection 34. The U-shaped member thereupon returns to its normal position under the influence of the spring 33 and returns the shutters 37 and 38 to closed position. Upon release of the lever 9, it returns to its normal or uppermost position under the influence of its associated spring 49, the stop 63 of the lever 20 having been withdrawn out of the path of its movement and locked against returning into such path by the engagement of a side edge of the tooth 61 with the projection 41 during the movement of the lug 59 over the cam surface 62 on the second downward movement of the release lever 9.

It will be observed from the foregoing description that I have provided a simply constructed shutter, the parts thereof being relatively few and of extremely simple construction which enables the mechanism not only to perform satisfactorily under all operating conditions but enables it to stand abuse during usage without the danger of getting out of order. The casing for the mechanism is preferably made of a phenol condensation product such as "Bakelite" and is composed of one integral piece of material to provide the front wall 2 with its recesses 5, 6 and 7 and the arcuate slot 16, the central annular portion 3 with its inwardly extending flange 3a which defines the lens opening and the encompassing side wall. The casing can be made in one operation to provide the aforementioned parts as well as the other necessary apertures and threaded portions, such as the internal threads in the annular portion 3, as well as the necessary hub portions on the interior thereof to properly position and provide bearing surfaces for the respective levers, such as, for example, the inwardly extending and internally threaded hub portion 67 (see Fig. 12) on which is seated the pivoted ends of the levers 20 and 54. In this connection, it will be noted that there are only four operating levers included in the mechanism, two of which levers, 18 and 25, are pivotally mounted on the pin 21 while the other two levers, 20 and 54, are pivotally mounted on the pin 51. The levers 18 and 25 are controlled in their movements by a single spring 23 while levers 20 and 54 preferably each have a separate spring, namely springs 52 and 55, respectively. The parts are contained between a cover plate 14 and a rear plate 68, the plates 14 and 68 and the casing 1 being securely held together by a plurality of threaded pins 69 which extend through aligned apertures in the plate 14 and the front wall 2 of the casing and are threadedly secured to the rear plate 68. As has been previously mentioned, the spring body 10 of the indicator is loosely mounted in the groove 5 between the front plate 14 and the front wall 2 of the casing or housing, such spring body being maintained against inadvertent movement by reason of its spring pressure against the inner surface of the groove 5 and the interior face of the front plate 14. The rear plate 68 is provided with a central aperture having a diameter equal to the diameter of the area enclosed by the internal flange 3a of the annular portion 3 of the casing and may serve as a support for the iris of the camera, such iris being mounted on such rear plate in any suitable manner.

It will also be evident from the foregoing description that modifications and changes in the construction and arrangement of the parts which form the shutter unit can be made without departing from the spirit and scope of the invention, as defined in the following claims.

I claim:

1. A camera shutter comprising an indicator, a lever controlled by said indicator, an arcuately shaped tripping lever having an axis of rotation common with the axis of rotation of said controlled lever, a spring connected to said levers and normally biasing said controlled lever towards said indicator and said tripping lever away from said indicator, release means coacting with one end of said tripping lever and shutter control mechanism connected to the other end of said tripping lever the end of said tripping lever adjacent to said release means carrying a pivoted pawl, a stop on such end engageable by said pawl and a spring normally maintaining said pawl in contact with said stop, and said release means including a tooth having a position of rest and adapted to maintain the normal relation of said pawl and stop and through the latter to pivot said tripping lever against the tension of its associated spring when moved from its at rest position and to pivot said pawl away from said stop when returning to its position of rest.

2. A shutter mechanism comprising a support, an indicator, release means and shutter control mechanism pivotally connected in spaced relation to said support, a control lever and a tripping lever having a common pivot mounted on said support intermediate their ends, said control lever having a cam face on one end and an offset portion at its other end and said tripping lever having one end associated with said release means and its other end associated with said shutter control mechanism, a spring connected to the offset portion of said control lever and connected to said tripping lever on the opposite side of the common pivot of such levers and arranged to maintain the cam face of said control lever in engagement with said indicator and to bias the release means engaging end of said tripping lever away from said indicator.

3. A shutter mechanism comprising a support, an indicator, release means and shutter control mechanism pivotally connected in spaced relation to said support, a control lever having one end offset and its other end provided with a cam surface for engagement with said indicator, a tripping lever having one end associated with said shutter control mechanism and carrying on its other end a spring tensioned pawl arranged to coact with said release means, a screw member extending through said control lever and tripping lever intermediate their ends and threadedly engaged with said support to pivotally mount said levers on said support, said tripping lever in the region of said screw member being provided with a tab having its end portion bent in parallelism with the body of said lever and being provided with an aperture through which said screw member extends, a spring coiled about said screw member intermediate the outer end of said tab and the body of said tripping lever, one end of said spring being secured to the offset end of said control lever and its other end being secured to said tripping lever so as to bias said control and tripping levers in opposite directions.

4. A shutter mechanism comprising a tripping lever having a spring tensioned pawl provided at one end, a bulb control lever and a time control lever pivoted about a common axis and each having cam surfaces intermediate their ends, release means comprising a release lever, a shaft member supporting said lever, a plate member secured to said shaft member and spaced from said release lever, a tooth on said plate member adapted to engage with the spring tensioned pawl on said tripping lever, an offset cam member on said plate member adapted to engage with the cam surfaces of said control levers, and a projecting member provided on said plate member adapted to be engaged by a cable release.

5. A camera shutter comprising a support, an indicator associated with such support, a control lever pivotally mounted intermediate its ends on said support and controlled by said indicator, a tripping lever mounted intermediate its ends for movement about an axis common with the axis of rotation of said control lever, a spring connected to said levers on opposite sides of the common axis of said levers and normally biasing said control lever towards said indicator and said tripping lever away from said indicator, a spring tensioned pawl carried on one end of said tripping lever, a stop on said tripping lever blocking movement of said pawl in one direction, a pin extending transversely through said support, a release lever secured to one end of said pin, an actuating member affixed to the other end of said pin and a spring encircling said pin and bearing at one end on said actuating member and at its other end on said support to maintain said actuating member in a position of rest spaced from said pawl, said actuating member being adapted to move into engagement with said pawl and through the latter and said stop to pivot said tripping lever against the tension of its associated spring when actuated from its position of rest by said release lever and to pivot said pawl away from said stop when returning to its position of rest, and shutter control mechanism connected to the other end of said tripping lever and actuatable by said tripping lever when the latter is rotated by said actuating member.

6. In a camera shutter having an indicator, a release lever and a pivoted control device, the combination of a control lever and a tripping lever having a common pivot intermediate their ends, a bulb control lever and a time control lever pivotally connected at one end on a common axis positioned substantially diametrically opposite the common pivot of said control and tripping levers and having their free ends disposed in opposed relation to free ends of said control and tripping levers, the opposing end of said control lever being in engagement with and controlled by the indicator, the opposing end of said tripping lever being provided with a spring pressed pawl having a limited range of movement and an abutment member, said bulb and time control levers each being provided with a tooth engageable with said abutment in the operations of the shutter, a plate affixed to said release lever and having an actuating member adapted to co-act with said pawl to actuate said tripping lever so as to cause the latter to operate the shutter control device, and said plate being provided with an offset abutment extending across the path of movement of said bulb and time control levers and engageable with cam shaped portions of such levers to disengage the teeth thereof from the abutment on said tripping lever in the operations of the release lever.

7. A camera shutter comprising a tripping lever having a free end provided with an abutment, a bulb control lever and a time control lever connected at one end on a common axis and being each provided with a tooth engageable with said abutment in the operations of the shutter, a release lever, an actuating plate member connected to and controlled by said release lever and provided with a rigid offset member extending across the path of outward movement of said bulb and time control levers, said bulb and time control levers each being provided with an outwardly extending cam engageable by said offset member in the operations of the release lever to disengage the teeth of said bulb and time levers from said abutment, and a stop member on said time control lever adapted to come into engagement with said offset member to restrict its movement in one direction.

8. A camera shutter such as is defined in claim 7, in which the cam on said bulb control lever and the stop member on said time control lever are so arranged that said offset member in the operations of the release lever engages the cam of said bulb lever just prior to its engagement with the stop member and maintains its operative engagement with such cam while restricted against movement by said stop member.

BRUNO MAYER.